United States Patent

[11] 3,564,315

| | | | |
|---|---|---|---|
| [72] | Inventors | Sterling C. Barton; Joseph A. Victor, Scotia, N.Y. | |
| [21] | Appl. No. | 876,866 | |
| [22] | Filed | Nov. 14, 1969 | |
| [45] | Patented | Feb. 16, 1971 | |
| [73] | Assignee | General Electric Company | |

[54] EVAPORATIVE COOLED COLLECTOR RINGS FOR DYNAMOELECTRIC MACHINE
5 Claims, 2 Drawing Figs.

[52] U.S. Cl. .................................... 310/227, 310/54
[51] Int. Cl. .................................... H02k 9/28
[50] Field of Search .......................... 310/227, 229, 231, 232, 54

[56] References Cited
UNITED STATES PATENTS

| | | | |
|---|---|---|---|
| 2,950,403 | 8/1960 | Kilner et al. .................. | 310/232 |
| 3,296,470 | 1/1967 | Barbashev et al. ............. | 310/54 |
| 3,320,447 | 5/1967 | Banchieri ..................... | 310/54 |
| 3,444,408 | 5/1969 | Krulls ......................... | 310/232 |

Primary Examiner—Milton O. Hirshfield
Assistant Examiner—L. L. Smith
Attorneys—William C. Crutcher, Frank L. Neuhauser, Oscar B. Waddell and Joseph B. Forman ABSTRACT: In a dynamoelectric machine of the type having brushes transmitting current to a shaft-mounted collector ring, the ring is cooled by vaporization of water fed to its underside by a sleeve enclosing the shaft. The sleeve and shaft form an annular passage which conducts steam away from the collector. The sleeve has a radial ring providing a liquid seal and internal passages to feed the liquid into the vaporization chamber.

3,564,315

EVAPORATIVE COOLED COLLECTOR RINGS FOR DYNAMOELECTRIC MACHINE

BACKGROUND OF THE INVENTION

This invention relates generally to the cooling of collector rings for dynamoelectric machines such as large turbine generators, and more particularly, to provisions for evaporative cooling of such rings.

Excitation current for the rotating field windings of large turbine generators is normally provided through carbon brushes in sliding contact with the rotating collector rings on the turbine shaft. One limiting factor which determines brush life is the current density through the sliding contact area, and it is known that the current density can be increased with better ring cooling.

It has been suggested in the prior art such as U.S. Pat. No. 3,320,447 - Banchieri (1967) that the collector rings can be cooled with liquid by means of passages in the collector rings which are part of a total closed liquid-cooling circuit. However, closed liquid systems in rotating equipment are highly subject to leakage problems.

It has also been suggested in the prior art in U.S. Pat. No. 3,444,408 - Krulls (1969), which patent is assigned to the present assignee, that a collector using liquid metal rather than conventional brushes, can be cooled by a blanket of water and steam over the liquid metal in a rotating enclosure. In that patent, two rotating liquids seals were required to seal off a vapor chamber and the steam was removed from a relatively long unsupported sleeve extending into the collector enclosure.

Cooling of collector rings presents a difficult problem, because the collector ring diameter cannot be increased without also increasing the tangential brush rubbing speeds. A compact and efficient means of cooling the collector to a reasonable constant temperature is greatly to be desired.

Accordingly, one object of the present invention is to provide an improved construction for evaporative cooling of a dynamoelectric machine collector ring.

Another object of the invention is to provide an improved means of supplying liquid to and collecting vapor from an evaporative cooled collector, along with an improved feed and seal arrangement.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which FIG. 1 is a horizontal elevation, partly in section, of a portion of a dynamoelectric machine shaft with liquid supply manifold, steam-collecting pipe, and collector ring, only one such ring being shown for purposes of illustration, and FIG. 2 is a modified form of the invention.

SUMMARY OF THE INVENTION

Briefly stated, the invention comprises a collector ring with an overhanging cylindrical portion adapted for brush sliding contact on the outer surface and a rotating liquid chamber on the inner surface. A hollow sleeve encloses the shaft and has a ring thereon projecting into the liquid chamber to seal off a vapor chamber. Liquid is fed from the interior of the hollow sleeve into the inner side of the liquid seal. Steam is conducted out of the vapor chamber between the hollow sleeve and the shaft to a vapor collection pipe.

DESCRIPTION OF THE PREFERRED EMBODIMENT

Figure 1:
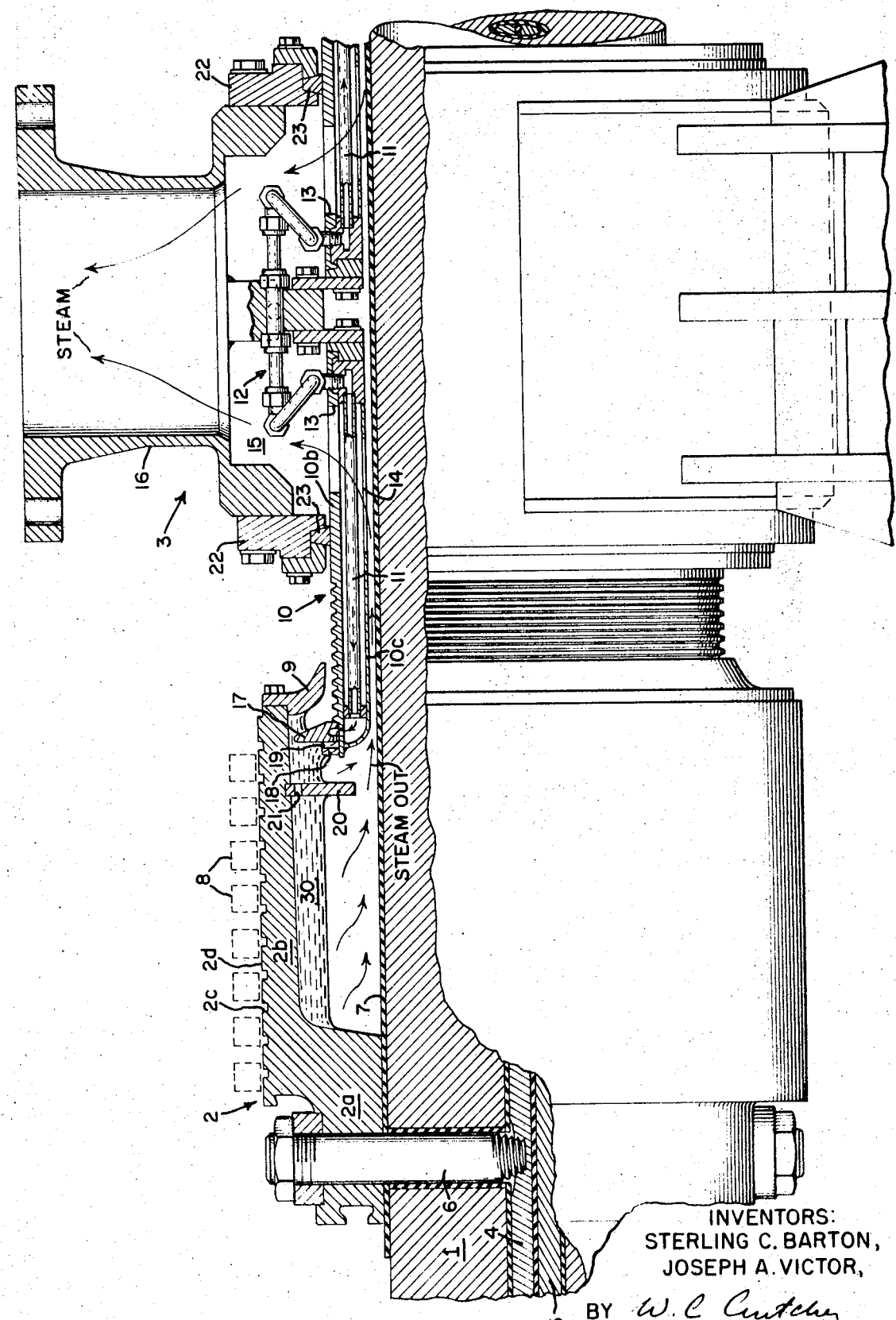

FIG. 1 shows a portion of a generator shaft 1 having a collector ring 2 thereon cooled by evaporation by boiling of liquid supplied from a central manifold assembly 3. Another collector ring (not shown because of space limitations) is disposed upon the other side of manifold assembly 3 and is identical to collector ring 2 except that it faces in the opposite direction.

Shaft portion 1 has a central insulated bore carrying the two insulated connection bars 4, 5, each of which is electrically connected to one of the two collection rings by means of one or two radially extending terminal studs such as 6. The connection bars 4, 5 may themselves be separately cooled by a fluid through constructions such as those illustrated in U.S. Pat. Nos. 3,393,333 - Kudlacik (1968) or 3,353,043 - Albright (1967).

The collection ring 2 includes a hub portion 2a mounted on the shaft and insulated therefrom by means of an insulating sleeve 7. Hub 2a supports an extending cylindrical overhanging portion 2b which, in a conventional manner, is provided on its outer surface with spiral grooves 2c separating the brush rubbing surfaces 2d. The brush outlines are indicated by reference numerals 8. The brush holder construction is not shown, but a suitable arrangement is shown in U.S. Pat. No. 3,387,155 - Krulls (1968). The aforedescribed construction is conventional, except that the overhung collector ring portion 2b is much longer and thinner than in the prior art collectors.

In accordance with the invention, a contoured ring member 9 is attached to the end of the overhung collector portion 2b and extends radially inward towards shaft 1 to form a liquid dam, thereby defining a rotating liquid chamber 30. Ring 9 is detachable in order to assemble the parts during construction.

The sleeve 10 is made up of an outer wall 10b and an inner coaxial wall 10c when are attached together by means of radial ribs. Between ribs are a number of circumferentially spaced liquid feed pipes 11 fed from a liquid supply piping arrangement indicated generally at 12.

The outer wall 10b and the inner wall 10c have openings 13, 14 respectively, permitting passage of steam through the walls into an annular steam collection chamber 15, to exit through a steam collection pipe 16. From there, the steam passes to a condenser and cooling system (not shown) and is returned back to the liquid supply manifold 12.

Referring to sealing and feeding arrangement of the collector enclosure itself, a stationary ring 17 is mounted near the end of the sleeve 10 and extends radially outward into the liquid to form a liquid seal. A second smaller ring 18 is disposed on the outer end of sleeve 10 and is spaced from ring 17 to provide an annular liquid feed chamber 19. Chamber 19 is supplied with liquid from pipes 11 via cutouts in the base of ring 17 and through the outer wall 10b of the sleeve as indicated.

In order to maintain a more effective liquid seal, a rotating ring 20 is fitted in a recess in the extension 2b of the collector and extends radially inward. A passageway 21 allows liquid to flow freely in both directions so as to equalize the liquid level on either side of ring 20.

It is characteristic of dynamoelectric machine rotors that the rotor (and attached collection rings) exhibit considerable axial movement due to thermal expansion, whereas the manifold assembly 3 and sleeves 10 are stationary. Therefore, sufficient axial space is left between rotating rings 9 and 20 to accommodate movement of these rings with respect to the stationary rings 17, 18.

The construction of the opposite polarity collection ring on the opposite side of manifold 3 is identical to collection ring 2, but is not shown because of space limitations. Thus a completely sealed steam chamber extends from the hub 2a of one collection ring to a similar hub on the other collection ring running along the shaft inside of the sleeve extensions 10. A steam seal with the outer wall of the sleeve 10 is provided by means of two spaced rings 22, each carrying a tapered washer 23 at their inner ends, and adjusting means to force the washers against the sleeve.

OPERATION OF THE INVENTION

A suitable liquid, here preferably water of reasonable purity to avoid residue buildup, is supplied from manifold 12 through the axial pipes 11 and into the feed annulus 19 between rings 17, 18. The liquid is distributed across the inner surface of the collector overhanging extension 2b, this process being facilitated by holes 21 in rotating ring 20. Vaporization or boiling of the liquid takes place due to the heat received from the collector ring 2 and as equilibrium is assumed at some constant temperature, the liquid level "rises" toward the rotor axis due to the decreased pressure. As the liquid encounters the feed annulus 19, it serves to provide an automatic level control by balancing the liquid head against the pressure of the incoming liquid, which can simply be gravity fed, if desired.

Steam exists through the annular chamber between sleeve 10 and the shaft, through openings 14, 13, and out the steam collection pipe 16 to the condenser. From there it is cooled and recirculated back to the feed manifold 12.

It will be apparent that the evaporative process is substantially a contact temperature process and therefore the collector ring is maintained at a suitable temperature which can be adjusted by maintaining the vapor pressure at a value to coincide with the best temperature to give good brush life at increased current density.

MODIFICATION

Figure 2:
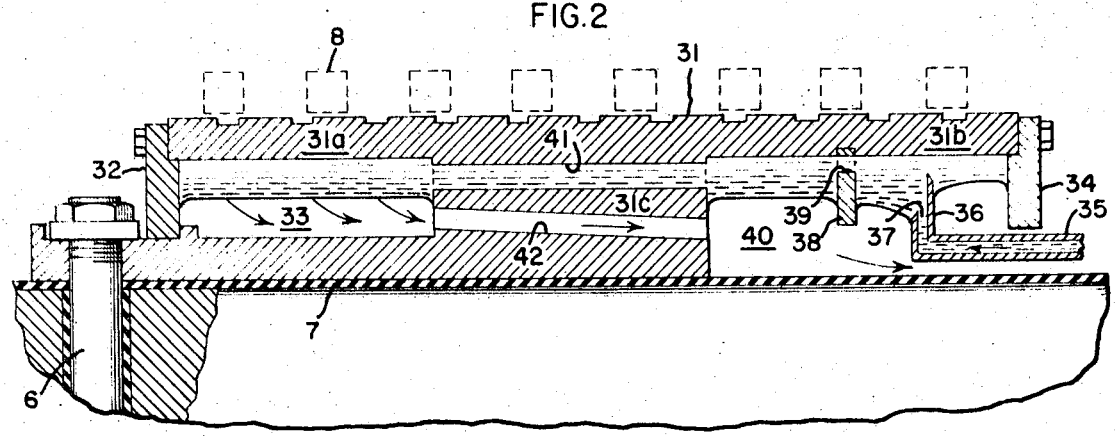

FIG. 2 of the drawing shows a modified form of the invention only the collector ring being shown. The central manifold assembly 3 is the same as described in connection with FIG. 1.

A collector ring 31, rather than having a single overhanging portion, is double ended in shape and includes two overhanging portions 31a, 31b, extending in opposite directions from a central supporting hub 31c. On the left, a ring 32 is sealingly engaged between extension 31a and an inner extension of hub 31c so as to define a sealed annular chamber 33. On the opposite end, a radial ring 34 extends inward toward the shaft to provide a liquid dam as before. A hollow sleeve 35 on the shaft extends between dam 34 and the shaft. As indicated in schematic form, a ring 36 with an internal annular feed passage 37 is attached to the end of the sleeve and extends radially outward. A rotating ring 38 with passages 39 is attached to the inside of the overhanging ring extension assists in maintaining a liquid seal as before in a rotating liquid and vapor chamber 40.

In order to conduct liquid to chamber 33 and vapor back to the chamber 40, a number of inner and outer axial passages 41, 42 through the hub are provided as shown.

Operation of the FIG. 2 modification is essentially as before. Liquid is fed through the passages in the sleeve 35 and enters the chamber 40 between rotating rings 34, 38 to form a liquid seal. Liquid is distributed along the inner surface of the collector ring extensions through axial passage 41. Vaporization or boiling takes place and steam is conducted from chamber 33 (through passages 42) and from chamber 40 into the annular passage between sleeve 35 and the shaft where it is collected in the central manifold assembly as before.

The FIG. 2 modification may be preferable where it is desired to obtain a longer collector ring rubbing surface for the brushes 8 without excessive deflection of the ring extensions due to centrifugal force, since the ring extensions are shorter than in FIG. 1.

The foregoing invention provides an extremely compact and simple means for cooling a brush type collector ring. Other modifications will occur to those skilled in the art and it is desired to cover in the appended claims all such modifications as fall within the true spirit and scope of the invention.

We claim:

1. In a dynamoelectric machine of the type having collector rings disposed on a shaft and electrically connected to leads within the shaft, the improvement comprising:
    a hub portion insulated from the shaft;
    an axially extending overhanging portion having an outer surface adapted for rubbing electrical contact with brushes;
    a rotating first ring attached to said overhanging portion and extending radially inward therefrom to provide a liquid dam;
    a sleeve member surrounding said shaft portion and extending between said first ring and the shaft and having a stationary second ring member thereon extending radially outward and adapted to provide a rotating seal with liquid confined by said first ring;
    liquid supply conduit means comprising passageways inside said inside said sleeve and discharging into said overhanging collector ring portion;
    vapor removal conduit means including an annular passage defined between the sleeve and the shaft and conducting vapor away from the collector.

2. The combination according to claim 1, wherein said second ring defines an annular feed passage with a circumferential outlet disposed inward of the radially outermost periphery of the second ring and also disposed on the side thereof toward the hub.

3. The combination according to claim 1, and further including a rotating third ring member having axial passages therethrough and extending radially inward from said overhanging portion and spaced from said first ring to define a sealing chamber therebetween, said second ring extending into said sealing chamber.

4. The combination according to claim 1, wherein said collector ring further defines a liquid tight annular chamber on the opposite side of said hub portion from the overhanging portion, said hub portion defining first axial passages for admitting liquid to said annular chamber and second axial passages for conducting vapor from said annular chamber back through the hub portion.

5. In a dynamoelectric machine of the type having first and second collector rings disposed on a shaft and electrically connected to leads within the shaft, the improvement comprising:
    first and second collector ring hub portions insulated from the shaft and spaced axially from one another;
    first and second axially extending overhanging portions on the respective hubs extending toward one another and having first and second outer surfaces adapted for rubbing contact with brushes;
    a sleeve surrounding the shaft to define an annular passage therewith and having its opposite ends extending under said respective overhanging portions;
    first and second rotating ring members attached to the respective overhanging portions to define rotating liquid chambers beneath the overhanging portions;
    first and second stationary ring members disposed on opposite ends of the sleeve and extending into the rotating liquid chambers to provide liquid seals;
    an annular steam collection chamber sealing disposed about the sleeve between said collector ring;
    means to feed liquid in opposite directions through the sleeve to the rotating liquid chambers; and
    passage means through the sleeve connecting said annular steam collection chamber with said annular passage between sleeve and shaft.